United States Patent
Wang et al.

(10) Patent No.: US 10,768,312 B1
(45) Date of Patent: Sep. 8, 2020

(54) INTEGRITY ANALYSIS METHOD BASED ON KINEMATIC-TO-KINEMATIC RELATIVE POSITIONING SCENARIO

(71) Applicant: Beihang University, Beijing (CN)

(72) Inventors: Zhipeng Wang, Beijing (CN); Yanbo Zhu, Beijing (CN); Xiaopeng Hou, Beijing (CN); Kun Fang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 16/713,322

(22) Filed: Dec. 13, 2019

(30) Foreign Application Priority Data

Nov. 7, 2019 (CN) .......................... 2019 1 1081247

(51) Int. Cl.
*G01S 19/44* (2010.01)
*G01S 19/51* (2010.01)

(52) U.S. Cl.
CPC ............. *G01S 19/44* (2013.01); *G01S 19/51* (2013.01)

(58) Field of Classification Search
CPC ........... G01S 19/44; G01S 19/04; G01S 19/51
See application file for complete search history.

(56) References Cited

U.S. PATENT DOCUMENTS

2006/0164297 A1* 7/2006 Hernandez-Pajares ...................... G01S 19/44 342/357.27

2011/0181462 A1* 7/2011 Lawrence ............... G01S 19/44 342/357.26
2015/0185331 A1* 7/2015 Dai ......................... G01S 19/44 342/357.27

FOREIGN PATENT DOCUMENTS

WO WO-2008150390 A1 * 12/2008 ............. G01S 19/44

OTHER PUBLICATIONS

Z. Liu, A new approach for cycle slip detection and fix using single GPS receiver's single satellite dual frequency data containing arbitrarily large pseudorange errors, The Journal of Global Positioning Systems, vol. 16(5), p. 1-21, Mar. 2018 (Year: 2018).*

* cited by examiner

*Primary Examiner* — Bernarr E Gregory
*Assistant Examiner* — Fred H Mull
(74) *Attorney, Agent, or Firm* — Locke Lord LLP; Tim Tingkang Xia, Esq.

(57) ABSTRACT

The present invention provides an integrity analysis method based on a kinematic-to-kinematic relative positioning scenario, including the following steps: a) establishing a kinematic-to-kinematic relative positioning model, and inputting navigation data; b) calculating a float solution of an integer ambiguity; c) detecting and correcting cycle slips based on a total electron content rate; d) calculating a probability of correct fix and a probability of incorrect fix for the integer ambiguity; e) determining a fault to be detected and a satellite fault probability; 0 calculating a standard deviation $\delta\_(v|CF)$ and a position domain deviation $b\_m$; and g) calculating an integrity risk value of a carrier phase. The present invention provides an integer ambiguity calculation algorithm for a kinematic-to-kinematic positioning system in the case of a long baseline, to calculate carrier phase integrity.

11 Claims, 5 Drawing Sheets

INTEGRITY ANALYSIS METHOD BASED ON KINEMATIC-TO-KINEMATIC RELATIVE POSITIONING SCENARIO

CROSS-REFERENCE TO RELATED PATENT APPLICATION

This non-provisional application claims priority to and the benefit of, pursuant to 35 U.S.C. § 119(a), patent application Serial No. CN201911081247.X filed in China on Nov. 7, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present invention relates to the technical field of satellite navigation, and in particular, to the technical field of integrity monitoring for kinematic-to-kinematic relative positioning by using carrier phases in satellite navigation.

BACKGROUND

With the continuous development of GNSS system high-precision positioning, the demand for GNSS positioning grows incessantly in various industries. The conventional real-time kinematic positioning (RTK) technology is widely applied to "static-kinematic" scenarios in engineer application. However, in a "kinematic-kinematic" scenario, the issue of high-precision relative positioning between two moving targets needs to be solved, and the original technology can no longer meet requirements of users. Therefore, a kinematic-to-kinematic differential positioning technology has emerged. In kinematic-to-kinematic differential positioning, the position of a reference station does not need to be known accurately, while a relative position between the reference station and a moving station is the focus of concern. After the ambiguity is fixed correctly, the relative position between the reference station and the moving station can be determined precisely in real time.

Meanwhile, in a highly kinematic situation, for example, during autonomous aerial re-fueling and autonomous landing, high integrity and high accuracy need to be satisfied at the same time. In these application scenarios, it is necessary to use carrier phase measurement to improve precision. Therefore, the issue of position domain integrity of integer ambiguity calculation in a carrier phase measurement quantity in a satellite navigation system is proposed. Generally, it is conservatively assumed that all incorrect fix of ambiguities may lead to high-risk positioning errors. Although such a conservative assumption is simple, it unnecessarily limits the availability of navigation that has strict requirements on integrity and accuracy. Accuracy and integrity risks are basic performance indexes affecting the availability of the navigation system. In the Global Navigation Satellite System (GNSS), the integrity risk refers to a capability of sending an alarm to a user in time when the navigation system cannot be used for a navigation service. In addition, for a new aerospace application, a carrier phase observation quantity needs to be used to ensure that high integrity and high accuracy are satisfied at the same time.

In these application scenarios, to use a kinematic-to-kinematic differential carrier phase measurement quantity, the following problems need to be solved: First of all, in order to implement centimeter-level positioning precision by using carrier phase measurement, the issue of integer ambiguity needs to be solved. In the existing integer ambiguity calculation algorithm, an LAMBDA algorithm, a TCRA algorithm, and a WL-NL algorithm are mainly used. The core idea is to calculate the integer ambiguity by using different combined observation values. However, in some application scenarios with a long baseline distance, a positioning error convergence speed declines, and calculation of the integer ambiguity becomes difficult. The second problem is how to rationally quantify the integrity risk in a kinematic-to-kinematic positioning scenario through carrier phase measurement in satellite navigation. The existing theories are based on the conservative assumption. It is assumed that all incorrectly fixed integer ambiguities lead to a relatively large positioning error, and an integrity risk is calculated based on this condition. Such an assumption greatly limits the availability of the positioning system, and cannot be applied to practical scenarios desirably.

For the first problem, the concept of On The Fly (OTF) was initially proposed by Seeber et al. in 1989. Positioning is implemented by a combined observation quantity of a pseudorange and a carrier phase. Besides, in 1990, Hatch proposed the concept of calculating an integer ambiguity with the least square method, in which an ambiguity space is searched and screened by selecting an optimal combination and a suboptimal combination, to finally calculate the ambiguity. This method is also further developed. In 1992, Abidin et al. optimized the least square search algorithm and proposed an on-the-fly ambiguity calculation method in combination with an ambiguity function method. In 2002, based on the foregoing method, Yang Yunchun et al. developed a single-epoch ambiguity calculation technology. In another type of ambiguity calculation methods, an ambiguity covariance approach is used. Integer ambiguities are searched by using a state vector and a variance-covariance matrix. The least-squares ambiguity decorrelation adjustment method, i.e., the LAMBDA algorithm, is the most commonly used method currently. The LAMBDA algorithm was initially proposed by Teunissen in 1993, and is one of the leading ambiguity calculation methods in use at present. It is generally considered at home and abroad that the LAMBDA algorithm achieves the highest search speed, is most reliable, and is also most compact theoretically. However, in a long-baseline case, it is still difficult to calculate an integer ambiguity in a kinematic-to-kinematic relative positioning scenario. Scholars in Beijing University of Aeronautics and Astronautics proposed an improved method based on the LAMBDA integer ambiguity calculation algorithm. In a short-baseline case, an integer ambiguity is directly calculated by using the LAMBDA algorithm. In a long-baseline case, WL-NL is used to fix integer ambiguities by means of direct rounding, and subsequently, L1 ambiguities can be searched for by using the LAMBDA algorithm after wide-line ambiguities are obtained. The two algorithms are combined, and then ambiguity searching and fixing are performed. Wide-line ambiguities are fixed first, and then narrow-lane L1-frequency ambiguities are calculated by using an ionosphere-free composite model and a wide-lane observation value composite equation, so that the complexity of calculation can be effectively reduced, the calculation load is decreased, and geometric integrity can be ensured, thus facilitating rapid calculation of the integer ambiguity and shortening a convergence time of a positioning error.

For the second problem, with the continuous upgrade of satellite navigation application scenarios, the position domain integrity risk is quantified rationally and the centimeter-level positioning precision is implemented by using carrier phase measurement. A prior probability of correct fix of integer ambiguities may be obtained by correctly fixing the integer ambiguities, and such a probability is referred to as Probability of Correct Fix (PCF). Moreover, the PCF needs to meet the integrity risk requirement. In addition, in the process of calculating the integrity risk, a Probability of Incorrect Fix (PIF) is defined. Besides, a PIF threshold is derived, where the PIF threshold should be distributed from the total navigation integrity risk and be less than the total navigation integrity risk. In a typical positioning navigation process, an ambiguity subset may be determined by merely using a probability lower than the PIF threshold in combination with a probability of incorrect fix, while float solutions of the rest of ambiguities are reserved. Then, partially fixed ambiguities are used to calculate a position estimated value and calculate a corresponding position domain protection level. Finally, the influence of incorrectly fixed ambiguities is evaluated in the position domain to calculate the integrity risk.

In view of the research status of the kinematic-to-kinematic relative positioning and the integrity thereof, and in combination with the conception of the existing methods, this patent proposes an improvement in a long-baseline case based on the LAMBDA integer ambiguity calculation algorithm, to correctly fix integer ambiguities, so that the success rate of ambiguity calculation reaches 99% or higher, and a fixing rate of the integer ambiguities is as high as 97%. After that, the influence caused by incorrectly fixed ambiguities in the position domain is evaluated to define an upper limit of an integrity risk in a navigation process. An integrity threshold calculated based on a partial ambiguity resolution algorithm is proposed. Finally, the integrity calculation in kinematic-to-kinematic relative positioning is implemented.

SUMMARY

An objective of the present invention is to overcome the defects in the prior art and provide an integrity analysis method based on a kinematic-to-kinematic relative positioning scenario, which provides an integer ambiguity calculation algorithm for a kinematic-to-kinematic positioning system in the case of a long baseline, to calculate carrier phase integrity, where integer ambiguities are fixed using a partial ambiguity resolution method without traversing all integer spaces, thus greatly improving the calculation efficiency.

In order to solve the foregoing method, the present invention uses the following technical solution: An integrity analysis method based on a kinematic-to-kinematic relative positioning scenario includes the following steps:

a) establishing a kinematic-to-kinematic relative positioning model, and inputting navigation data;
b) calculating a float solution of an integer ambiguity;
c) detecting and correcting cycle slips based on a total electron content rate, including:

step 1: performing linear combination of wide-lane phase minus narrow-lane pseudorange and detecting an ionospheric total electron content rate for the foregoing solution data respectively:

$$[\Delta N_1^P(k) - \Delta N_2^P(k)] = N_{WL}^P(k-1) - N_{WL}^P(k) = \left[\Phi_1^P(k-1) - \Phi_2^P(k-1) - \frac{f_1 P_1^P(k-1) + f_2 P_2^P(k-1)}{\lambda_{WL}(f_1+f_2)}\right] - \left[\Phi_1^P(k) - \Phi_2^P(k) - \frac{f_1 P_1^P(k) + f_2 P_2^P(k)}{\lambda_{WL}(f_1+f_2)}\right];$$

$$[\lambda_1 \Delta N_1^P(k) - \lambda_2 \Delta N_2^P(k)] = \frac{40.3 \times 10^{16}(\gamma-1)\Delta t \cdot TECR_\Phi(k)}{f_1^2} - \lambda_1[\Phi_1^P(k) - \Phi_1^P(k-1)] + \lambda_2[\Phi_2^P(k) - \Phi_2^P(k-1)];$$

where $f_1$, $f_2$ represent two frequencies of a received double-frequency satellite signal; $\lambda_1$, $\lambda_2$ represent wavelengths at corresponding frequencies;

$$\gamma = \frac{f_1^2}{f_2^2}; \lambda_{WL} = \frac{C}{(f_1-f_2)};$$

$TECR_\Phi(k)$ represents an ionospheric total electron content rate at an epoch K; $\Phi_1^P(k)$ and $\Phi_1^P(k-1)$ represent carrier phase measurement values between two adjacent epochs at the frequency $f_1$; $P_1^P(k)$ and $P_1^P(k-1)$ represent pseudorange measurement values between two adjacent epochs at the frequency $f_1$; $\Delta N_1^P(k)$ and $\Delta N_1^P(k)$ represent cycle slips that are detected at the frequencies $f_1$ and $f_2$ using a cycle as a unit respectively; c represents a light velocity; $N_{WL}^P(k)$ and $N_{WL}^P(k-1)$ represent integer ambiguities between two adjacent epochs;

step 2: calculating influence of a pseudo random error on cycle slip detection;

$$SPIE_{max} = \max\{|\delta P_1^P(k)|, |\delta_2^P(k)|\}, \delta P_1^P(k), \delta P_2^P(k) \in (-\infty, +\infty);$$

where $\delta P_1^P(k)$ and $\delta P_2^P(k)$ represent pseudorange measurements at $f_1$ and $f_2$ at the epoch K respectively, and $SPIE_{max}$ represents a maximum value of a pseudo random error;

step 3: calculating cycle slip search areas;

$$SS_{\Delta N_1^P(k)}: \Delta N_1^P(k) - \delta \Delta N_1^P(k) \leq \Delta N_1^P(k)_{cand} \leq \Delta N_1^P(k) + \delta \Delta N_1^P(k);$$

$$SS_{\Delta N_2^P(k)}: \Delta N_2^P(k) - \delta \Delta N_2^P(k) \leq \Delta N_2^P(k)_{cand} \leq \Delta N_2^P(k) + \delta \Delta N_2^P(k);$$

where $\Delta N_1^P(k)_{cand}$ represents a correct cycle slip search area at L1 and $\Delta N_2^P(k)_{cand}$ represents a correct cycle slip search area at L2;

step 4: calculating a wide-lane cycle slip variation by using a cycle slip search rule 1; and calculating a total electron content rate threshold by using a cycle slip search rule 2;

$$TECR_\Phi(k) = H\{\lambda_1[\Phi_1^P(k) - \Phi_1^P(k-1)] + \lambda_2[\Phi_2^P(k-1) - \Phi_2^P(k)] + [\lambda_1 \Delta N_1^P(k)_{cand} - \lambda_2 \Delta N_2^P(k)_{cand}]\};$$

wherein $$H = \frac{f_1^2}{40.3 \times 10^{16}(\gamma-1)\Delta t};$$

d) calculating a probability of correct fix PCF and a probability of incorrect fix PIF for the integer ambiguity;

calculating a probability of a candidate ambiguity value Z:

$$P(\breve{a}=z) = \prod_{i=1}^{m}\left[\Phi\left(\frac{1-2I_i^T(a-z)}{2\sigma_{i|I}}\right)+\Phi\left(\frac{1+2I_i^T(a-z)}{2\sigma_{i|I}}\right)-1\right]$$

where ă represents an integer ambiguity estimated using a bootstrap method; a represents a correctly fixed integer ambiguity; represents $\sigma_{i|I}$ standard deviation of ambiguities, and the standard deviation depends on a set I={1, 2, ..., i−1}; $I_i$ represents the $i^{th}$ column vector of a unit-lower-triangular matrix $L^{-T}$ generated from decomposition of $LDL^T$ of a fuzzy covariance matrix; m represents the number of fixed integer ambiguities, and $$\Phi(x) = \int_{-\infty}^{x}(1/\sqrt{2\pi})\exp\left(-\frac{1}{2}v^2\right)dv;$$

a−z represents a difference obtained by subtracting an integer ambiguity calculated using a correlation method from an integer ambiguity calculated using a bootstrap method;

when the correctly fixed integer ambiguity a is equal to the candidate ambiguity value Z, the probability of correct fix PCF can be calculated:

$$P(\breve{a}=a) = \prod_{i=1}^{m}\left[2\Phi\left(\frac{1}{2\sigma_{i|I}}\right)-1\right]$$

the probability of incorrect fix PIF can be calculated by using an exclusion relation between a correct fix event and an incorrect fix event;

e) determining a fault to be detected and a satellite fault probability;

f) calculating a standard deviation $\delta_{v|CF}$ and a position domain deviation $b_m$;

wherein the following models are established: y=Gx+ε and $$\begin{cases}\hat{x}=Sy \\ S=(G^TWG)^{-1}GW\end{cases};$$

and an ambiguity float solution-relative position vector matrix $\hat{S}$ and a related estimated error covariance matrix can be obtained according to the foregoing equations:

$$\hat{S}=\begin{bmatrix}\hat{x}\\\hat{N}\end{bmatrix}; P=\begin{bmatrix}P_{\hat{x}} & P_{\hat{x}\hat{N}}\\P_{\hat{N}\hat{x}} & P_{\hat{N}}\end{bmatrix};$$

step 1: calculating the $k^{th}$ integer ambiguity element $N_Z^{(k)}$;

$$N_Z^{(k)}=\text{round}([0_{1\times 3}Z_k]S^{(k-1)});$$

where $Z_k$ represents the $k^{th}$ row of a transition matrix Z; $Z_{1:k}=[0_{1\times(k-1)}\ 1\ 0_{1\times(n-k)}]$; $s^{(k-1)}$ represents an updated state vector S based on fixed ambiguities 1→K;

step 2: calculating the standard deviation $\delta_{v|CF}$; and continuously updating position vector estimation and remaining ambiguity real values S;

$$K=P^{(k-1)}[0_{1\times 3}Z_k]^T([0_{1\times 3}Z_k]^TP^{(k-1)}[0_{1\times 3}Z_k]^T)^{-1}$$

$$S^{(k)}=S^{(k-1)}+K(N_Z^{(k)}-[0_{1\times 3}Z_k]^TS^{(k-1)})$$

$$P^{(k)}=(I-K[0_{1\times 3}Z_k])P^{(k-1)}$$

where K represents a gain; P represents a covariance matrix of position and float ambiguity state estimated error; $P^{(k)}$ represents a covariance matrix of an updated state vector after the $k^{th}$ ambiguity is fixed; and it is assumed that $\delta_{v|CF}=\sqrt{P_{(3,3)}^{(m)}}$ after m iterations;

step 3:
calculating the position domain deviation $b_m$;

$$K=P[0_{m\times 3}Z_{1:m}]^T([0_{m\times 3}Z_{1:m}]P[0_{m\times 3}Z_{1:m}]^T)^{-1}$$

$$S(m)=\hat{S}+K(N_Z^{(1:m)}-[0_{m\times 3}Z_{1:m}]^T\hat{S})$$

where $Z_{1:m}$ represents a transition matrix Z of a row vector 1 to $Z_{1:m}=[I_{m\times m}\ 0_{m\times(n-m)}]$; $N_Z^{(1:m)}$ represents a fixed solution for fix of 1 to m integer ambiguities;

the position domain deviation $b_m$ caused by a relative position error of the $m^{th}$ incorrect candidate pair $(a-z)_m$ is:

$$b_m=S_{CF}^{(m)}-S_{IF}^{(m)}=K(a-z)_m$$

where $a_m$ represents a correctly fixed ambiguity vector; $z_m$ represents an incorrectly fixed ambiguity vectors; $S_{CF}^{(m)}$ represents a correct state obtained after fix of m ambiguities; $S_{IF}^{(m)}$ represents an incorrect state obtained after fix of m ambiguities;

$$S_{CF}^{(m)}=\hat{S}+K(a_m-[0_{m\times 3}Z_{1:m}]\hat{S})$$

$$S_{IF}^{(m)}=\hat{S}+K(z_m-[0_{m\times 3}Z_{1:m}]\hat{S});$$

g) calculating an integrity risk value $I_{H0}$ of a carrier phase;

$$I_{H0}=1-(1-P\{|\hat{x}_v-x_v|>VAL|CF\})PCF-\sum_{n=1}^{k}(1-P\{|\hat{x}_v-x_v|>VAL|IF_n\})PIF_n$$

where $P_{VALCF}=P\{|\hat{x}_v-x_v|>VAL|CF\}$ represents a probability that a vertical error is greater than an alarm threshold under the condition of correct fix; PCF represents a probability of correct fix; $PIF_n$ represents a probability of incorrect fix; $P_{VALIF}=P\{|\hat{x}_v-x_v|>VAL|IF_n\}$ represents a probability that a vertical error is greater than an alarm threshold under the condition of incorrect fix.

Preferably, the calculating a float solution of an integer ambiguity includes the following steps: establishing a function model y=f(x,β) corresponding to m satellite-collect points $(x_1,y_1,z_1), (x_2,y_2,z_2), \ldots, (x_m,y_m,z_m)$, and calculating a minimum value β of a residual sum of squares, to minimize the residual sum of squares;

$$S(\beta)=\sum_{i=1}^{m}r_i(\beta)^2;$$

and a residual $r_i=y_i-f(x_i, \beta)$ can be calculated; and the minimum value can be calculated by taking a derivative of the foregoing equation:

$$\frac{\partial S}{\partial\beta_j}=2\sum_i r_i\frac{\partial r_i}{\partial\beta_j}=0\ (j=1,\ldots,n).$$

Preferably, a maximum allowable number of satellite faults is calculated according to $N_{fault,max}=\max\{r\in 1, \ldots, N_{sat} | P_{multiple} (r+1, P_{event,1}, \ldots, P_{event,N_{sat}+N_{const}}) \leq P_{FAVLT\_THRES}\}$; where $P_{event,i}=PIF_i$ represents a prior probability of an independent error event i; $N_{fault,max}$ represents a probability of a multi-fault modes consisting of r independent events; $N_{sat}$ represents the number of satellites; $N_{const}$ represents the number of constellations; $P_{multiple}$ represents a probability that multiple satellite are faulty; and $P_{FAVLT-THRES}$ represents an alarm threshold.

Preferably, $N_{fault,max}$ of a combination corresponding to all subsets can be determined according to the $N_{fault,max}$, and is used to determine the satellite fault probability.

Preferably, a conditional variance $\sigma_{i/I}^2$ of an ambiguity i is defined, the conditional variance depends on previously fixed integer ambiguities of the set $I=\{1, 2, \ldots, i-1\}$, and an item (i, i) in a diagonal matrix D is generated from decomposition of a float solution estimated error covariance matrix $LDL^T$ of cycle ambiguities.

Preferably, by calculating the influence of the pseudo random error on cycle slip detection, a maximum value $\delta\Delta N_1^P$ of cycle slips detected at the frequency $f_1$ using a cycle as a unit, a maximum value $\delta\Delta N_2^P(k)_{max}$ of cycle slips detected at the frequency $f_2$ using a cycle as a unit, and a difference $\delta[\Delta N_1^P(k)-\Delta N_2^P(k)]_{max}$ between the maximum values of cycle slips detected at the frequencies $f_1$ and $f_2$ using a cycle as a unit can be calculated:

$$\delta[\Delta N_1^P(k) - \Delta N_2^P(k)] = \text{int}\left[\frac{f_1\delta P_1^P(k) + f_2\delta P_2^P(k)}{\lambda_{WL}(f_1 + f_2)}\right]$$

$$\delta\Delta N_1^P(k) = \text{int}\left[\frac{-\lambda_2}{(\lambda_1 - \lambda_2)}\frac{f_1\delta P_1^P(k) + f_2\delta P_2^P(k)}{\lambda_{WL}(f_1 + f_2)}\right]$$

$$\delta\Delta N_2^P(k) = \text{int}\left[\frac{-\lambda_1}{(\lambda_1 - \lambda_2)}\frac{f_1\delta P_1^P(k) + f_2\delta P_2^P(k)}{\lambda_{WL}(f_1 + f_2)}\right]$$

Preferably, the wide-lane cycle slip variation can be calculated by using the maximum value $SPIE_{max}$ of the pseudo random error.

Preferably, a threshold model of the total electron content rate can further reduce remaining cycle slip candidate pairs, and can further revise carrier phase measurement values at the frequencies $f_1$ and $f_2$ for candidate pairs $\Delta N_1^P(k)_{cand}$ at the frequency $f_1$ and candidate pairs $\Delta N_2^P(k)_{cand}$ at the frequency $f_2$:

$$\widetilde{\Phi_1^P(k)} = \Phi_1^P(k) + \Delta N_1^P(k)_{cand}$$

$$\widetilde{\Phi_2^P(k)} = \Phi_2^P(k) + \Delta N_2^P(k)_{cand}$$

Preferably, when the probability of correct fix PCF and the probability of incorrect fix PIF are calculated for the integer ambiguity, a conditional variance of an ambiguity i is defined as $\sigma_{i/I}^2$, the conditional variance depends on previously fixed integer ambiguities of the set $I=\{1, 2, \ldots, i-1\}$, and an item (i, i) in a diagonal matrix D is generated from decomposition of a float solution estimated error covariance matrix $LDL^T$ of cycle ambiguities.

Preferably, the probability of correct fix PCF is calculated, and for the calculation of the probability of incorrect fix PIF, a value of (a z) can be used, and a candidate value of interest in an incorrect fix event is calculated.

The present invention provides a kinematic-to-kinematic relative positioning processing procedure in the case of a long baseline: geometric correlation between two moving stations is determined according to a distance between the two moving stations, and different integer ambiguity calculation algorithms are selected, where an LAMBDA algorithm is directly used for calculation in the case of a short baseline distance, and in the case of a medium to long baseline distance, a wide-lane integer ambiguity is first calculated through direct rounding, and then an ambiguity at a single frequency, that is, a narrow-lane ambiguity, is calculated by using the LAMBDA algorithm.

The present invention proposes calculation of a probability of incorrect fix by calculating an ambiguity subset: for calculation of a probability of incorrect fix and a probability of correct fix for ambiguities, integer ambiguities are sequentially fixed using a bootstrap method, and sequential adjustment is performed according to variances of the integer ambiguity solutions, where an ambiguity with a minimum conditional variance needs to be fixed first, so as to improve a fixing rate of the integer ambiguities.

The present invention proposes construction of ambiguity candidate pairs by calculating partial ambiguities: a threshold of the probability of incorrect fix is calculated according to ambiguities that are already fixed; if the threshold is less than a specified integrity risk, the threshold is considered to be available. If a protection level calculated by using the ambiguities that are already fixed is greater than an alarm threshold, a candidate set of incorrect fix (IF) needs to be constructed; then an integrity risk value $I_{H0}$ is calculated; next, it is compared whether the integrity risk value $I_{H0}$ is less than $I_{H0req}$ required by zero-fault integrity; if yes, the geometric mechanism is considered to be available; if the integrity risk value $I_{H0}$ is greater than $I_{H0req}$ required by zero-fault integrity, a float solution of a next ambiguity needs to be fixed, without traversing all the ambiguity candidate pairs.

The present invention proposes a method for calculating a VPL value: determining an upper limit and a lower limit of a VPL; checking whether a VPL position error statistical limit satisfies an overall integrity risk, and finding and outputting a VPL value that satisfies the integrity risk.

The present invention uses an integrity risk in a position domain with partial ambiguity resolution, and improves integrity and availability requirements of the position domain. When a satellite is visible in a time period that is longer than a maximum pre-filtering time, a pre-filtering time is set to be the maximum pre-filtering time; by applying a position domain integrity risk in navigation, position precision can be greatly improved, strict integrity and availability requirements can be satisfied, and calculation efficiency can be improved. Moreover, the integrity risk formula is also applicable to other cyclic resolution algorithms, and can fix a quantified probability at any given ambiguity candidate set. In a positioning and navigation process, an ambiguity subset is determined by using a probability lower than a PIF threshold in combination with a probability of incorrect fix, and float solutions of other ambiguities are reserved; then, a position estimated value is calculated by using partially fixed ambiguities, and a corresponding position domain protection level is calculated. Finally, influence of incorrect ambiguity fix is evaluated in the position domain, to calculate an integrity risk.

Compared with the prior art, the present invention achieves the following beneficial effects:

1. The present invention provides an integer ambiguity calculation algorithm for a kinematic-to-kinematic positioning system in the case of a long baseline, to calculate carrier phase integrity.

2. The present invention proposes fix of integer ambiguities by using a partial ambiguity resolution method, without traversing all integer spaces, thus greatly improving the calculation efficiency 3. The present invention provides a feasible calculation algorithm for long-baseline kinematic-to-kinematic relative positioning, thus effectively solving the problem of difficulty in ambiguity fix in the case of medium to long baselines.

4. The present invention helps motivate the research on carrier phase integrity, and can be effectively applied to practical kinematic-to-kinematic positioning application scenarios, to meet the integrity requirement while improving the positioning precision.

5. The present invention provides an idea for subsequent calculation of carrier phase protection level.

It should be appreciated that, the foregoing general description and the following detailed description are merely exemplary illustration and explanation, and should not be used as a limitation on the content claimed by the present invention.

BRIEF DESCRIPTION OF DRAWINGS

With reference to the accompanying drawings, more objectives, functions and advantages of the present invention will be illustrated through the following description of embodiments of the present invention, where.

DETAILED DESCRIPTION

Figure 1:
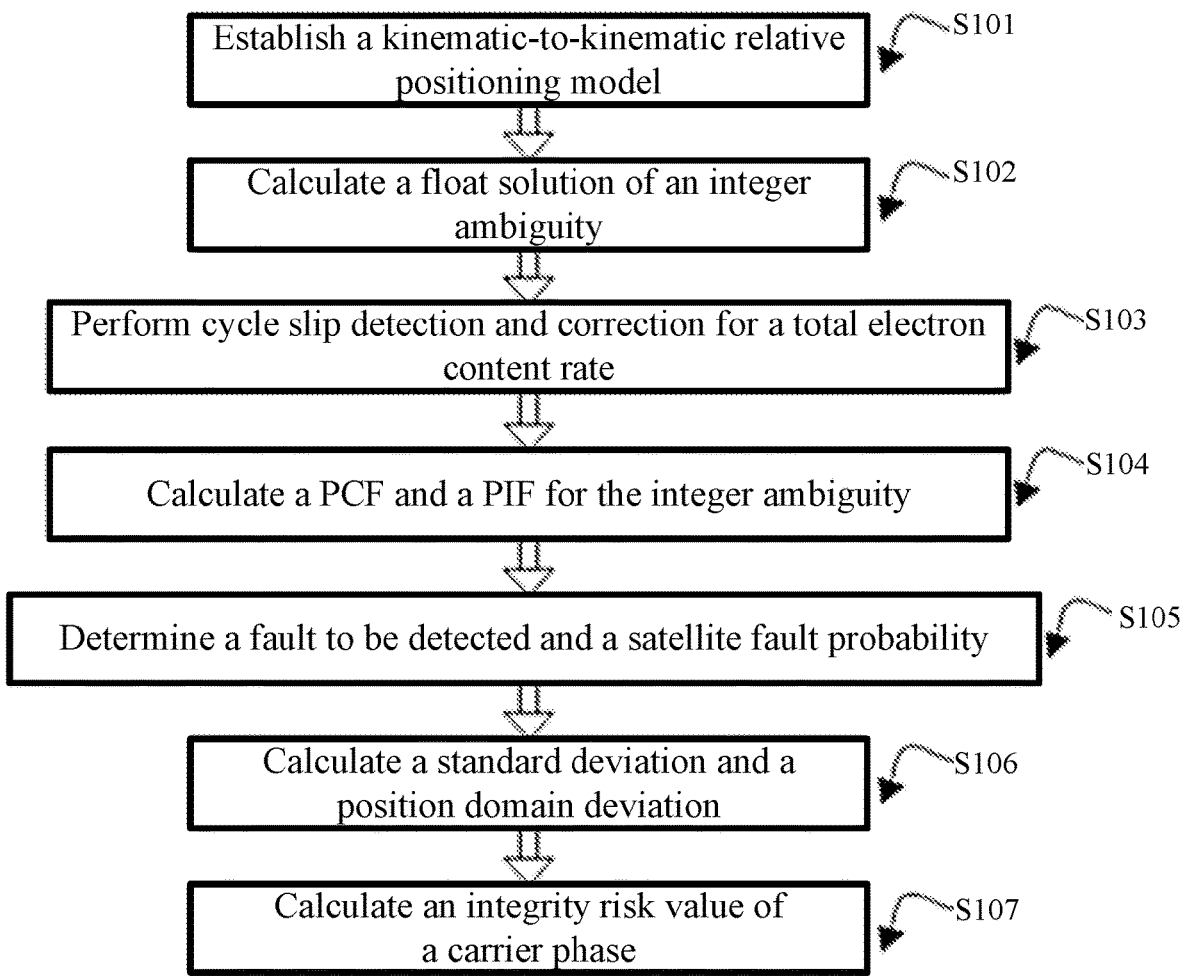
FIG. 1 is a schematic flow block diagram of an analysis method according to the present invention.

With reference to the exemplary embodiments, the objectives and functions of the present invention as well as methods for implementing the objectives and functions can be illustrated. However, the present invention is not limited to the exemplary embodiments disclosed below, and can be implemented in different forms. The essence of the specification is merely to help those in the related art understand the specific details of the present invention comprehensively.

In the following description, the embodiments of the present invention will be described with reference to the accompanying drawings. In the drawings, identical reference numerals represent identical or similar components, or identical or similar steps.

Figure 2:
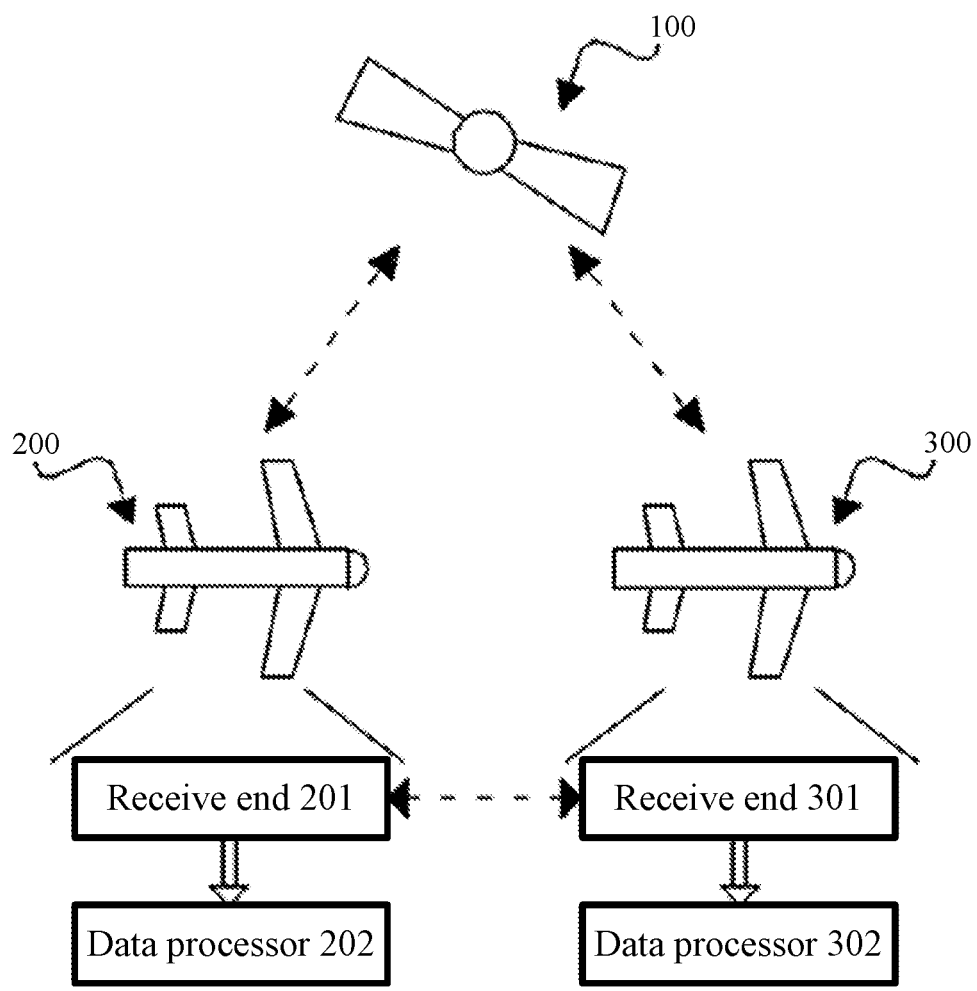
FIG. 2 is a schematic flow block diagram of exchange of collected sample information according to an embodiment of the present invention.
Figure 3:
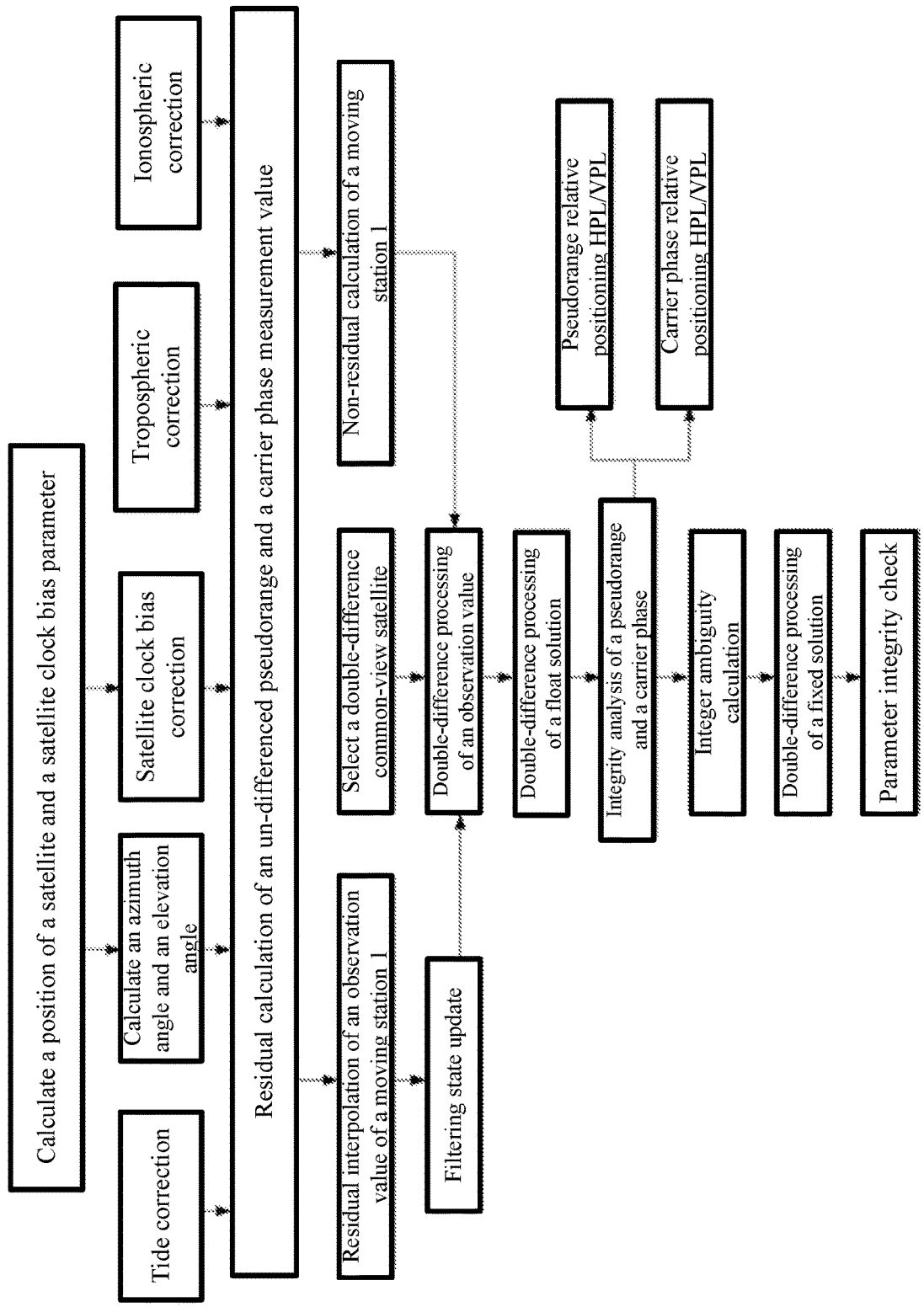
FIG. 3 is a schematic flowchart of kinematic-to-kinematic relative positioning calculation according to the present invention.

To make the content of the present invention described more clearly, a data source is described first. As shown in FIG. 2, which is a flow block diagram of exchange of collected sample information in an embodiment of the present invention, a satellite 100 provides collected information data to a first mobile station 200 and a second mobile station 300 respectively; a receive end 201 in the first mobile station 200 receives the information and performs algorithm processing on the information by using a data processor 202; a receive end 301 in the second mobile station 300 receives the information and performs algorithm processing on the information by using a data processor 302; information is exchanged between the receive end 201 and the receive end 301.

The method in the present invention is specifically described through an example. For a carrier phase integrity algorithm, a specific processing procedure and calculation of data are described as follows (as shown in FIG. 1):

a) Establish a kinematic-to-kinematic relative positioning model, and input navigation data.

b) Calculate a float solution of an integer ambiguity.

The float solution of the integer ambiguity is calculated by using a Gauss-Newton iterative method. The core idea is to approximately replace a nonlinear regression model by using a Taylor series expansion, then correct a regression coefficient multiple times through multiple iterations so that the regression coefficient continuously approximates an optimal regression coefficient of the nonlinear regression model, and finally a residual sum of squares of the original model is minimized.

(1) There are m known points:
$(x_i, y_1, z_1), (x_2, y_2, z_2), \ldots, (x_m, y_m, z_m)$ (2) The function prototype is: $y=f(x, \beta)$ where $m \geq n$, and $\beta=(\beta_1, \beta_2, \ldots, \beta_n)$; the key is to find an optimal solution $\beta$ to minimize the residual sum of squares:

$$S(\beta) = \sum_{i=1}^{m} r_i(\beta)^2,$$

and thereore a residual can be calculated: $r_i = y_i - f(x_i, \beta)$, where $r_i = y_i - f(x_i, \beta)$.

(3) A derivative of the formula (2) is taken, so that a minimum value of the residual sum of squares can be obtained;

$$\frac{\partial S}{\partial \beta_j} = 2 \sum_i r_i \frac{\partial r_i}{\partial \beta_j} = 0 \; (j = 1, \ldots, n)$$

A parameter calculated using an iterative least square method is closer to a parameter in a standard function, and a standard deviation is smaller. Therefore, the float solution of the ambiguity is calculated using the iterative least square method.

c) Detect and correct cycle slips based on a total electron content rate (TECR).

Figure 4:
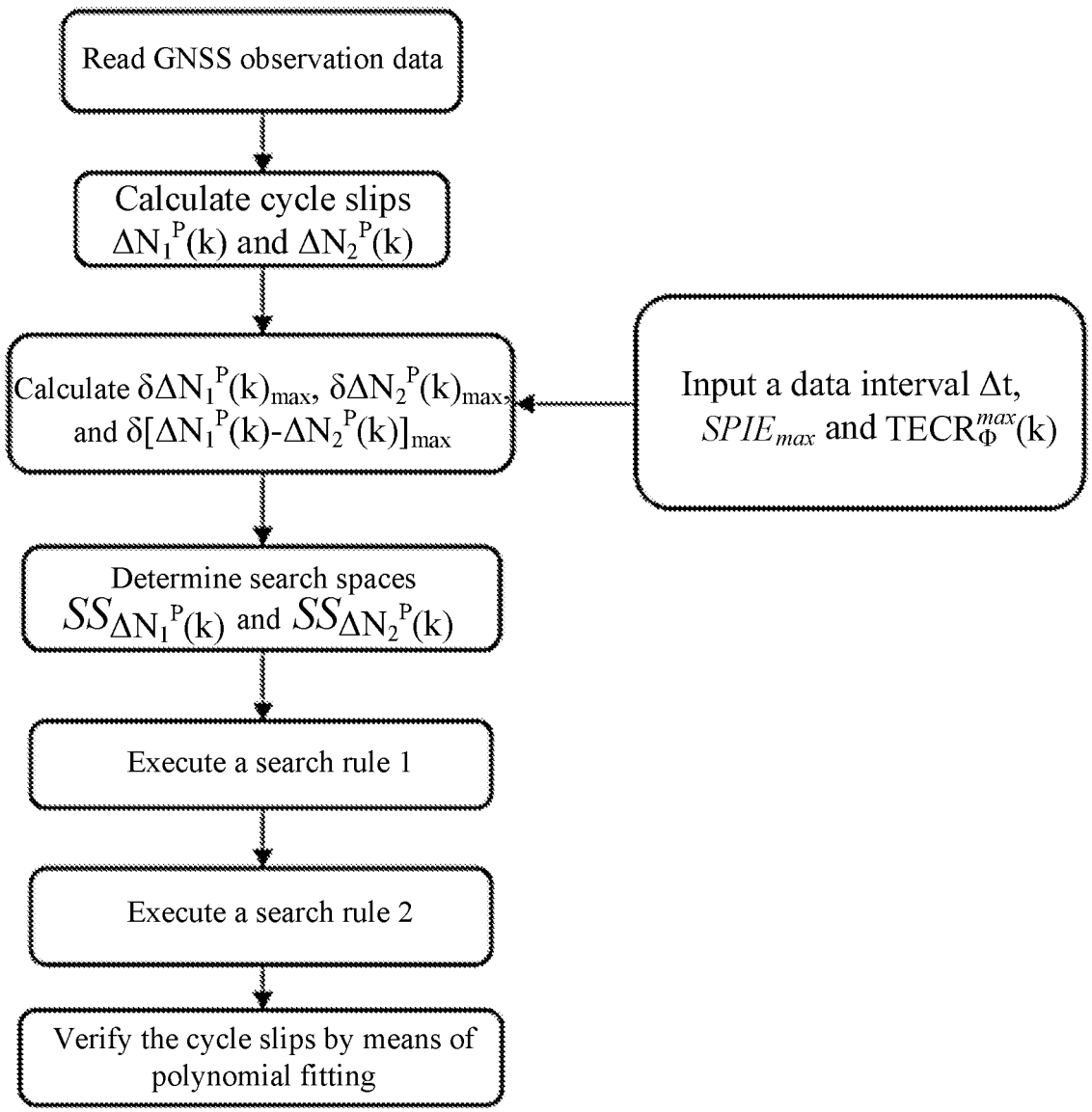
FIG. 4 is a schematic flowchart of cycle slip detection according to the present invention.

Based on a Melbourne-Wübbena Wide Lane (MWWL) linear combination integrated with TECR information, cycle slips can be detected and corrected in real time. This method can completely eliminate influence of SIPE on cycle slip detection and correction, and the issue of cycle slip detection and correction is solved by using a single dual-frequency receiver (as shown in FIG. 4).

This method uses total electron content rate (TECR) information in dual-frequency data from a single satellite of a single global positioning system receiver, while the pseudorange measurement is affected by an error in any range. A sudden increase in the pseudo random error (SIPE) is similar to a periodic fluctuation in nature, and is very common in various data collection scenarios. The basic principle of this method is the fact that an ionospheric TECR does not exceed a specific threshold (0.35 TECU/s). By evaluating the influence of the SIPE on cycle slip detection, a predefined large enough SIPE is given, and a search space for cycle slip candidate pairs is defined. Two cycle slip verification rules are proposed to verify cycle slip candidate pairs. Through the application of the two verification rules, over 99.9% of candidate pairs can be excluded. Based on the SIPE, the TECR threshold, and the size of a data sampling interval, a theoretic maximum number of remaining cycle slip candidate pairs (NRCP) can be calculated precisely.

Step 1: MW-based linear combination and TECR measurement

First of all, two formulas are provided, which represent MWWL-based linear combination and ionospheric TECR measurement respectively. The MWWL linear combination has been widely applied to cycle slip detection and correction, because it eliminates influence of atmosphere (including ionosphere and troposphere), a geometric structure of the satellite, and a receiver clock.

$$[\Delta N_1^P(k) - \Delta N_2^P(k)] = N_{WL}^P(k-1) - N_{WL}^P(k) = \left[\Phi_1^P(k-1) - \Phi_2^P(k-1) - \frac{f_1 P_1^P(k-1) + f_2 P_2^P(k-1)}{\lambda_{WL}(f_1 + f_2)}\right] - \left[\Phi_1^P(k) - \Phi_2^P(k) - \frac{f_1 P_1^P(k) + f_2 P_2^P(k)}{\lambda_{WL}(f_1 + f_2)}\right];$$

$$[\lambda_1 \Delta N_1^P(k) - \lambda_2 \Delta N_2^P(k)] = \frac{40.3 \times 10^{16}(\gamma-1)\Delta t \cdot TECR_\Phi(k)}{f_1^2} - \lambda_1[\Phi_1^P(k) - \Phi_1^P(k-1)] + \lambda_2[\Phi_2^P(k) - \Phi_2^P(k-1)]$$

where $f_1$, $f_2$ represent two frequencies of a received double-frequency satellite signal; $\lambda_1$, $\lambda_2$ represent wavelengths at corresponding frequencies;

$$\gamma = \frac{f_1^2}{f_2^2}; \lambda_{WL} = \frac{C}{(f_1 - f_2)};$$

$TECR_\Phi(k)$ represents an ionospheric total electron content rate at an epoch K; $\Phi_1^P(k)$ and $\Phi_1^P(k-1)$ represent carrier phase measurement values between two adjacent epochs at the frequency $f_1$; $P_1^P(k)$ and $P_1^P(k-1)$ represent pseudorange measurement values between two adjacent epochs at the frequency $f_1$; $\Delta N_1^P(k)$ and $\Delta N_2^P(k)$ represent cycle slips that are detected at the frequencies $f_1$ and $f_2$ using a cycle as a unit respectively.

Step 2: Influence of SPIE on cycle slip detection

Precise influence of a pseudorange error on cycle slip detection and positioning is estimated. At the epoch K, pseudorange measurements at two frequencies are required. If a pseudorange measurement value is SPIE, cycle slip detection in the formula is very likely to be affected. Pseudorange measurements of SPIE at two frequencies are defined as $\delta P_1^P(k)$ and $\delta P_2^P(k)$. Therefore, a maximum value of SPIE is:

$$SPIE_{max} = \{|\delta P_1^P(k)|, |\delta P_2^P(k)|\}, \delta P_1^P(k), \delta P_2^P(k) \in (-\infty, +\infty)$$

Therefore, $\delta \Delta N_1^P(k)_{max}$, $\delta \Delta N_2^P(k)_{max}$ and $\delta[\Delta N_1^P(k) - \Delta N_2^P(k)]_{max}$ can be obtained through based on the foregoing equation, where the formulas are as follows:

$$\delta[\Delta N_1^P(k) - \Delta N_2^P(k)] = \text{int}\left[\frac{f_1 \delta P_1^P(k) + f_2 \delta P_2^P(k)}{\lambda_{WL}(f_1 + f_2)}\right]$$

-continued $$\delta \Delta N_1^P(k) = \text{int}\left[\frac{-\lambda_2}{(\lambda_1 - \lambda_2)} \frac{f_1 \delta P_1^P(k) + f_2 \delta P_2^P(k)}{\lambda_{WL}(f_1 + f_2)}\right]$$

$$\delta \Delta N_2^P(k) = \text{int}\left[\frac{-\lambda_1}{(\lambda_1 - \lambda_2)} \frac{f_1 \delta P_1^P(k) + f_2 \delta P_2^P(k)}{\lambda_{WL}(f_1 + f_2)}\right]$$

Step 3: Define cycle slip search areas

Correct cycle slips at L1 can be inferred from the foregoing description, which are represented as represent: $\Delta N_1^P(k)_{cand}$. Similarly, correct cycle slips at L2 are defined as $\Delta N_2^P(k)_{cand}$. Therefore, a correct cycle slip search space can be obtained:

$SS_{\Delta N_1^P(k)}: \Delta N_1^P(k) - \delta \Delta N_1^P(k) \leq \Delta N_1^P(k)_{cand} \leq \Delta N_1^P(k) + \delta \Delta N_1^P(k);$ $SS_{\Delta N_2^P(k)}: \Delta N_2^P(k) - \delta \Delta N_2^P(k) \leq \Delta N_2^P(k)_{cand} \leq \Delta N_2^P(k) + \delta \Delta N_2^P(k);$ Step 4: Cycle slip search rules and estimation of remaining candidate pairs Cycle slip search is implemented mainly through two processes. First, most cycle slip candidate pairs are excluded through a wide-lane cycle slip variation rule, and then remaining candidate pairs are further estimated by using a TCER threshold.

Cycle slip search rule 1: wide-lane cycle slip variation

The wide-lane cycle slip variation can be calculated by using $SPIE_{max}$, and the difference from the previous wide-lane cycle slip calculation is that SPIE is not taken into consideration in the previous calculation.

Cycle Slip Search Rule 2: TECR Threshold

The TECR threshold model can further reduce the NRCP, and each candidate pair $\Delta N_1^P(k)_{cand}$ and $\Delta N_2^P(k)_{cand}$ can further correct carrier phase measurement values:

$$\widetilde{\Phi_1^P(k)} = \Phi_1^P(k) + \Delta N_1^P(k)_{cand}$$

$$\widetilde{\Phi_2^P(k)} = \Phi_2^P(k) + \Delta N_2^P(k)_{cand}$$

The value of TECR can be calculated between adjacent epochs:

$TECR_\Phi(k) = H\{\lambda_1[\Phi_1^P(k) - \Phi_1^P(k-1)] + \lambda_2[\Phi_2^P(k-1) - \Phi_2^P(k)] + [\lambda_1 \Delta N_1^P(k)_{cand} - \lambda_2 \Delta N_2^P(k)_{cand}]\};$ where $$H = \frac{f_1^2}{40.3 \times 10^{16}(\gamma-1)\Delta t};$$

d) Calculate a probability of correct fix PCF and a probability of incorrect fix PIF for the integer ambiguity.

Calculation of a probability that a certain group of ambiguities is correct depends on a fixation method in use. In the calculation process, a bootstrap method is used. This method provides a prior probability quality function about an integer estimation error in a closed form. It is required that the ambiguities should be fixed sequentially according to a particular standard sequence, and that PCF calculation should be provided in each step in the fix process. Sequential adjustment is performed according to variances of the integer ambiguity solutions, where an ambiguity with a minimum conditional variance needs to be fixed first It is defined that a conditional variance of an ambiguity i is $\sigma_{i/I}^2$, the conditional variance depends on previously fixed integer ambiguities of a set $I=\{1, 2, \ldots, i-1\}$, and an item (i, i) in a diagonal matrix D is generated from decomposition of a float solution estimated error covariance matrix $LDL^T$ of cycle ambiguities. In each step (such as the $m^{th}$ step) of the sequence, it is assumed that a correctly fixed integer ambiguity is a, and a probability that the integer ambiguity value ă (which is a vector of m×1) estimated using a bootstrap method is equal to the candidate ambiguity value Z calculated from the correctly fixed integer ambiguity a is shown by the following equation:

$$P(\breve{a}=z) = \prod_{i=1}^{m}\left[\Phi\left(\frac{1-2l_i^T(a-z)}{2\sigma_{i/I}}\right)+\Phi\left(\frac{1+2l_i^T(a-z)}{2\sigma_{i/I}}\right)-1\right]$$

where $l_i$ represents the $i^{th}$ column vector of a unit-lower-triangular matrix $L^{-T}$ generated from decomposition of $LDL^T$ of a fuzzy covariance matrix; m represents the number of fixed integer ambiguities, m<n, and $$\Phi(x) = \int_{-\infty}^{x}(1/\sqrt{2\pi})\exp\left(-\frac{1}{2}v^2\right)dv;$$

when the correctly fixed integer ambiguity a is equal to the candidate ambiguity value Z, the probability of correct fix PCF can be calculated:

$$P(\breve{a}=a) = \prod_{i=1}^{m}\left[2\Phi\left(\frac{1}{2\sigma_{i/I}}\right)-1\right]$$

For the calculation of PIF, a value of (a−z) can be used, and a candidate value of interest in an incorrect fix event is calculated. For example, if an error of one cycle exists in the first event of incorrect fix of ambiguity ($IF_1$), it can be obtained that $(a-z)=[1\ 0\ \ldots\ 0]^T$.

e) Determine a fault to be detected and a satellite fault probability

A method for detecting a fault mode is established by using the probability of incorrect fix PIF calculated in step d). It is specified that $PIF_i = P_{event,i}$, where $P_{event,i}$ represents a prior probability of an independent error event i. In addition, it is defined that a maximum number of faulty satellites is $N_{fault,max}$. $N_{fault,max}$ is calculated by calculating a probability of a multi-fault mode consisting of r or more independent events, and also represents a maximum allowable number of faults.

$N_{fault,max}=\max\{r\in 1,\ldots,N_{sat}|P_{multiple}(r+1, P_{event,1},\ldots,P_{event,N_{sat}+N_{const}})\le P_{FAVLT\_THRES}\}$ Once $N_{fault,max}$ is determined, $N_{fault,max}$ of a combination corresponding to all subsets is determined, and thus a satellite fault probability can be determined.

f) Calculate a standard deviation $\delta_{v|CF}$ and a position domain deviation $b_m$.

A series of models with errors can be effectively prevented by using a solution separation method. Therefore, this method is usually used as an optimal statistic. In some cases, the solution separation method has optimality. Test is carried out with Gaussian noise, to establish the following models: $y=Gx+\varepsilon$ and $$\begin{cases} \hat{x} = Sy \\ S = (G^TWG)^{-1}GW \end{cases};$$

thus the standard deviation $\delta_{v|CF}$ and the position domain deviation $b_m$ are calculated.

It is assumed that an ambiguity float solution-relative position vector matrix $\hat{S}$ and a related estimated error covariance matrix are defined as follows:

$$\hat{S} = \begin{bmatrix} \hat{x} \\ \hat{N} \end{bmatrix}; P = \begin{bmatrix} P_{\hat{x}} & P_{\hat{x}\hat{N}} \\ P_{\hat{N}\hat{x}} & P_{\hat{N}} \end{bmatrix}$$

Step 1: Round the $k^{th}$ ambiguity $\hat{N}_Z^{(k)}$ to the closest integer $N_Z^{(k)}$ in Z transition decorrelation space, where the expression is as follows: $N_Z^{(k)}=\text{round}([0_{1\times 3}\ Z_k]S^{(k-1)})$, where $Z_k$ represents the $k^{th}$ row in a transition matrix Z; $Z_{1:k}=[0_{1\times(k-1)}\ 1\ 0_{1\times(n-k)}]$; $S^{(k-1)}$ represents an updated state vector S based on fixed ambiguities $1 \to K$;

Step 2: Calculate the standard deviation $\delta_{v|CF}$.

Position vector estimation and remaining ambiguity real values S are updated continuously, where the process is as follows:

$$K=P^{(k-1)}[0_{1\times 3}Z_k]^T([0_{1\times 3}Z_k]P^{(k-1)}[0_{1\times 3}Z_k]^T)^{-1}$$

$$S^{(k)}=S^{(k-1)}+K(N_Z^{(k)}-[0_{1\times 3}Z_k]^TS^{(k-1)})$$

$$P^{(k)}=(I-K[0_{1\times 3}Z_k])P^{(k-1)}$$

P represents a covariance matrix of position and float ambiguity state estimated error; $P^{(k)}$ represents a covariance matrix of an updated state vector after the $k^{th}$ ambiguity is fixed; and it is assumed that $\delta_{v|CF}=\sqrt{P_{(3,3)}^{(m)}}$ after m iterations.

Step 3: Calculate the position domain deviation $b_m$.

For calculation of the position domain deviation $b_m$, after m ambiguities are fixed, the following calculation may be carried out:

$$K=P[0_{m\times 3}Z_{1:m}]^T([0_{m\times 3}Z_{1:m}]P[0_{m\times 3}Z_{1:m}]^T)^{-1}$$

$$S(m)=\hat{S}+K(N_Z^{(1:m)}-[0_{m\times 3}Z_{1:m}]^T\hat{S})$$

where $Z_{1:m}$ represents a transition matrix Z of a row vector 1 to m; and $Z_{1:m}$ is expressed as $Z_{1:m}=[I_{m\times m}\ 0_{m\times(n-m)}]$ If it is assumed that a correctly fixed ambiguity vector is $a_m$ and an incorrectly fixed ambiguity vector is $z_m$, the estimation state will become a correct state $S_{CF}$ or an incorrect state $S_{IF}$ after fix of the ambiguity, where the formulas are as follows:

$$S_{CF}^{(m)}=\hat{S}+K(a_m-[0_{m\times 3}Z_{1:m}]\hat{S})$$

$$S_{IF}^{(m)}=\hat{S}+K(z_m-[0_{m\times 3}Z_{1:m}]\hat{S});$$

Therefore, the position domain deviation $b_m$ caused by a relative position error of the $m^{th}$ incorrect candidate pair $(a-z)_m$ is:

$$b_m=S_{CF}^{(m)}-S_{IF}^{(m)}=K(a-z)_m$$

g) Calculate an integrity risk value of a carrier phase.

It is specified that $P_{VALCF}=P\{|\hat{x}_v-x_v|>VAL|CF\}$, $P_{VALIF}=P\{|\hat{x}_v-x_v|>VAL|IF_n\}$. Before an estimation vertical error exceeds a probability of a vertical protection level probability, for the purpose of simplification without loss of generality, conditional events CF and $IF_n$ are replaced by a general event B. To solve the difference between the correct fix event CF and the incorrect fix event IF and discuss a specific method of each event, by expanding an absolute value in a conditional probability formula, the following formula can be obtained based on a probability that a vertical error of occurrence of a given event B exceeds the VAL:

$$P\{|\hat{x}_v-x_v|>VAL\}B=P\{(\hat{x}_v-x_v)<-VAL|B\}+P\{(\hat{x}_v-x_v)>VAL|B\}$$

A position vector is estimated linearly by using GNSS measurement. It is assumed that the GNSS measurement has a zero-mean Gaussian error distribution. Therefore, the distribution of vertical position estimation errors is also a Gaussian distribution, and the standard deviation thereof is defined as $\epsilon_{v|B}$. The mean of such a distribution depends on the event B, and the mean is denoted as $\mu_B$. If the mean $\mu_B$ and the standard deviation $\delta_{v|B}$ are known, probabilities of the first item and the second item in the foregoing formula can be calculated by using a normal cumulative distribution function at extremes of –VAL and VAL respectively.

The standard deviation of the vertical position error is not affected by the incorrect fix. Therefore, $\delta_{v|B}=\delta_{v|CF}$, so $P_{VALIF}$ can be calculated by using a normal cumulative distribution function, where the standard deviation is $\delta=\delta_{v|CF}$, and the mean is $\mu_{IFn}=b_m$.

Therefore, the integrity risk value $I_{H0}$ is expressed as follows:

$$I_{H0} = 1 - (1 - P\{|\hat{x}_v - x_v| > VAL | CF\})PCF - \sum_{n=1}^{k}(1 - P\{|\hat{x}_v - x_v| > VAL | IF_n\})PIF_n$$

The present invention provides a kinematic-to-kinematic relative positioning processing procedure in the case of a long baseline: geometric correlation between two moving stations is determined according to a distance between the two moving stations, and different integer ambiguity calculation algorithms are selected, where an LAMBDA algorithm is directly used for calculation in the case of a short baseline distance, and in the case of a medium to long baseline distance, a wide-lane integer ambiguity is first calculated through direct rounding, and then an ambiguity at a single frequency, that is, a narrow-lane ambiguity, is calculated by using the LAMBDA algorithm.

The present invention proposes calculation of a probability of incorrect fix by calculating an ambiguity subset: for calculation of a probability of incorrect fix and a probability of correct fix for ambiguities, integer ambiguities are sequentially fixed using a bootstrap method, and sequential adjustment is performed according to variances of the integer ambiguity solutions, where an ambiguity with a minimum conditional variance needs to be fixed first, so as to improve a fixing rate of the integer ambiguities.

Figure 5:
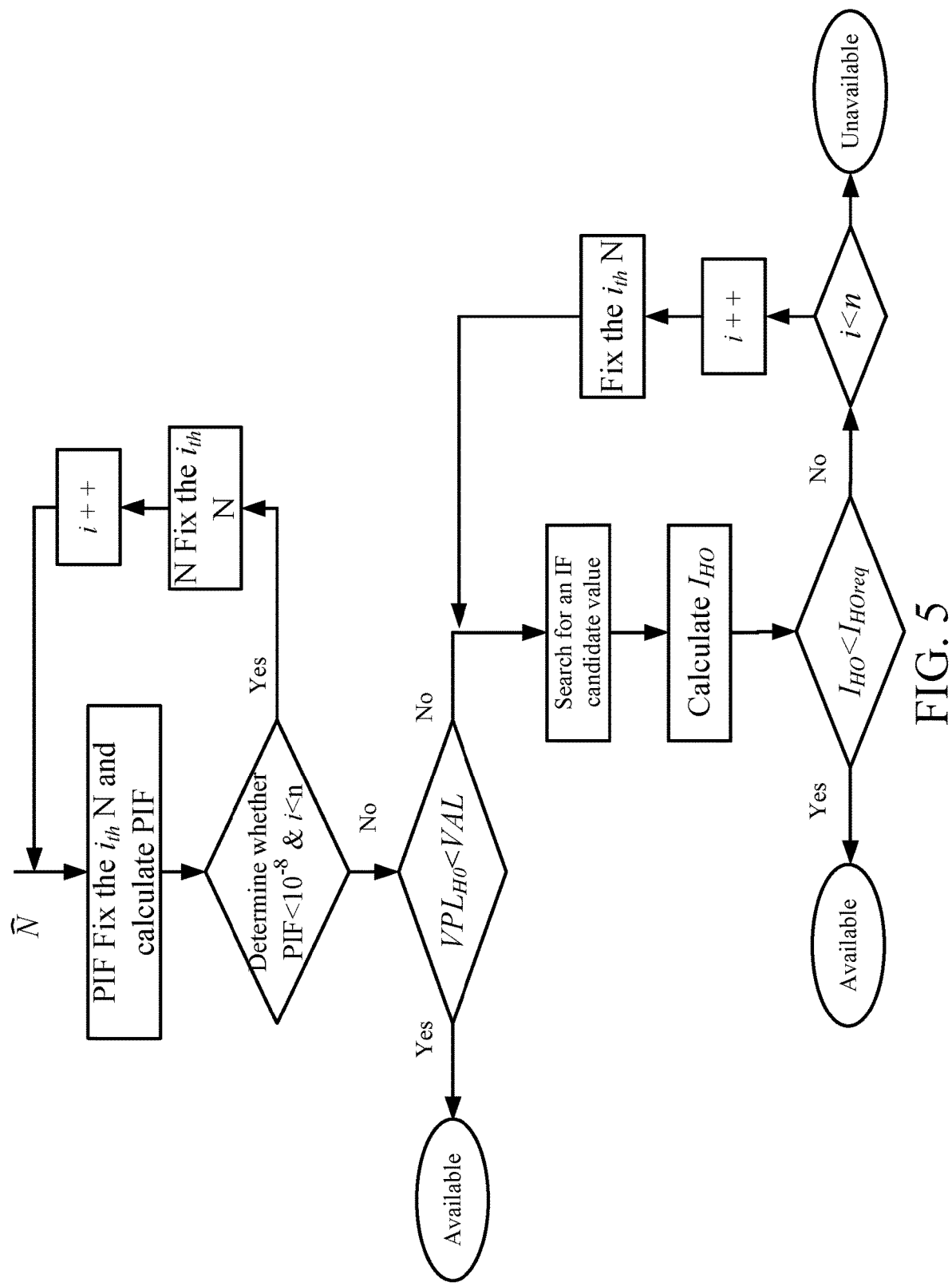
FIG. 5 is a schematic flowchart of calculating a position domain integrity risk based on partial fixation according to the present invention.

The present invention proposes construction of ambiguity candidate pairs by calculating partial ambiguities: a threshold of the probability of incorrect fix is calculated according to ambiguities that are already fixed; if the threshold is less than a specified integrity risk, the threshold is considered to be available. If a protection level calculated by using the ambiguities that are already fixed is greater than an alarm threshold, a candidate set of incorrect fix (IF) needs to be constructed; then an integrity risk value $I_{H0}$ is calculated; next, it is compared whether the integrity risk value $I_{H0}$ is less than $I_{H0req}$ required by zero-fault integrity; if yes, the geometric mechanism is considered to be available; if the integrity risk value $I_{H0}$ is greater than $I_{H0req}$ required by zero-fault integrity, a float solution of a next ambiguity needs to be fixed, without traversing all the ambiguity candidate pairs (as shown in FIG. 5), where $\hat{N}$ represents a float solution of an ambiguity, and N represents a fixed solution of the ambiguity obtained after the float solution of the ambiguity is fixed.

The present invention proposes a method for calculating a vertical protection level VPL value: determining an upper limit and a lower limit of a VPL; checking whether a VPL position error statistical limit satisfies an overall integrity risk, and finding and outputting a VPL value that satisfies the integrity risk.

The present invention uses an integrity risk in a position domain with partial ambiguity resolution, and improves integrity and availability requirements of the position domain. When a satellite is visible in a time period that is longer than a maximum pre-filtering time, a pre-filtering time is set to be the maximum pre-filtering time; by applying a position domain integrity risk in navigation, position precision can be greatly improved, strict integrity and availability requirements can be satisfied, and calculation efficiency can be improved. Moreover, the integrity risk formula is also applicable to other cyclic resolution algorithms, and can fix a quantified probability at any given ambiguity candidate set. In a positioning and navigation process, an ambiguity subset is determined by using a probability lower than a PIF threshold in combination with a probability of incorrect fix, and float solutions of other ambiguities are reserved; then, a position estimated value is calculated by using partially fixed ambiguities, and a corresponding position domain protection level is calculated. Finally, influence of incorrect ambiguity fix is evaluated in the position domain, to calculate an integrity risk.

The present invention has the following beneficial effects: The present invention provides an integer ambiguity calculation algorithm for a kinematic-to-kinematic positioning system in the case of a long baseline, to calculate carrier phase integrity. The present invention proposes fix of integer ambiguities by using a partial ambiguity resolution method, without traversing all integer spaces, thus greatly improving the calculation efficiency. The present invention provides a feasible calculation algorithm for long-baseline kinematic-to-kinematic relative positioning, thus effectively solving the problem of difficulty in ambiguity fix in the case of medium to long baselines. The present invention helps motivate the research on carrier phase integrity, and can be effectively applied to practical kinematic-to-kinematic positioning application scenarios, to meet the integrity requirement while improving the positioning precision. The present invention provides an idea for subsequent calculation of carrier phase protection level.

With reference to the description and practice of the present invention disclosed herein, other embodiments of the present invention are easily conceivable and comprehensible for those skilled in the art. The description and embodiments are merely considered as examples. The real scope and subject of the present invention are both defined by the claims.

What is claimed is:

1. An integrity analysis method based on a kinematic-to-kinematic relative positioning scenario, wherein, the analysis method comprises the following steps:
    a) establishing a kinematic-to-kinematic relative positioning model for a navigation system, and inputting navigation data;
    b) calculating a float solution of an integer ambiguity;
    c) detecting and correcting cycle slips based on a total electron content rate, comprising:

step 1: performing linear combination of wide-lane phase minus narrow-lane pseudorange and detecting an ionospheric total electron content rate for the foregoing solution data respectively:

$$[\Delta N_1^P(k) - \Delta N_2^P(k)] = N_{WL}^P(k-1) - N_{WL}^P(k) = \left[\Phi_1^P(k-1) - \Phi_2^P(k-1) - \frac{f_1 P_1^P(k-1) + f_2 P_2^P(k-1)}{\lambda_{WL}(f_1 + f_2)}\right] - \left[\Phi_1^P(k) - \Phi_2^P(k) - \frac{f_1 P_1^P(k) + f_2 P_2^P(k)}{\lambda_{WL}(f_1 + f_2)}\right];$$

$$[\lambda_1 \Delta N_1^P(k) - \lambda_2 \Delta N_2^P(k)] = \frac{40.3 \times 10^{16}(\gamma-1)\Delta t \cdot TECR_\Phi(k)}{f_1^2} - \lambda_1[\Phi_1^P(k) - \Phi_1^P(k-1)] + \lambda_2[\Phi_2^P(k) - \Phi_2^P(k-1)];$$

where $f_1$, $f_2$ represent two frequencies of a received double-frequency satellite signal; $\lambda_1$, $\lambda_2$ represent wavelengths at corresponding frequencies;

$$\gamma = \frac{f_1^2}{f_2^2}; \lambda_{WL} = \frac{c}{(f_1 - f_2)};$$

$TECR_\Phi(k)$ represents an ionospheric total electron content rate at an epoch K; $\Phi_1^P(k)$ and $\Phi_1^P(k-1)$ represent carrier phase measurement values between two adjacent epochs at the frequency $f_1$; $P_1^P(k)$ and $P_1^P(k-1)$ represent pseudorange measurement values between two adjacent epochs at the frequency $f_1$; $\Delta N_1^P(k)$ and $\Delta N_2^P(k)$ represent cycle slips that are detected at the frequencies $f_1$ and $f_2$ using a cycle as a unit respectively; c represents a light velocity; $N_{WL}^P(k)$ and $N_{WL}^P(k-1)$ represent integer ambiguities between two adjacent epochs;

step 2: calculating influence of a pseudo random error on cycle slip detection;

$$SPIE_{max} = \max\{|\delta P_1^P(k)|, |\delta P_2^P(k)|\}, \delta P_1^P(k), \delta P_2^P(k) \in (-\infty, +\infty);$$

where $\delta P_1^P(k)$ and $\delta P_2^P(k)$ represent pseudorange measurements at $f_1$ and $f_2$ at the epoch K respectively, and $SPIE_{max}$ represents a maximum value of a pseudo random error;

step 3: calculating cycle slip search areas;

$$SS_{\Delta N_1^P(k)}: \Delta N_1^P(k) - \delta\Delta N_1^P(k) \leq \Delta N_1^P(k)_{cand} \leq \Delta N_1^P(k) + \delta\Delta N_1^P(k);$$

$$SS_{\Delta N_2^P(k)}: \Delta N_2^P(k) - \delta\Delta N_2^P(k) \leq \Delta N_2^P(k)_{cand} \leq \Delta N_2^P(k) + \delta\Delta N_2^P(k);$$

where $\Delta N_1^P(k)_{cand}$ represents a correct cycle slip search area at L1, and $\Delta N_2^P(k)_{cand}$ represents a correct cycle slip search area at L2;

step 4: calculating a wide-lane cycle slip variation by using a cycle slip search rule 1; and calculating a total electron content rate threshold by using a cycle slip search rule 2;

$$TECR_\Phi(k) = H\{\lambda_1[\Phi_1^P(k) - \Phi_1^P(k-1)] + \lambda_2[\Phi_2^P(k-1) - \Phi_2^P(k)] + [\lambda_1 \Delta N_1^P(k)_{cand} - \lambda_2 \Delta N_2^P(k)_{cand}]\};$$

wherein $$H = \frac{f_1^2}{40.3 \times 10^{16}(\gamma-1)\Delta t};$$

d) calculating a probability of correct fix PCF and a probability of incorrect fix PIF for the integer ambiguity;

calculating a probability of a candidate ambiguity value Z:

$$P(\tilde{a} = z) = \prod_{i=1}^{m}\left[\Phi\left(\frac{1 - 2I_i^T(a-z)}{2\sigma_{i|I}}\right) + \Phi\left(\frac{1 + 2I_i^T(a-z)}{2\sigma_{i|I}}\right) - 1\right];$$

where $\tilde{a}$ represents an integer ambiguity estimated using a bootstrap method; a represents a correctly fixed integer ambiguity; $\sigma_{i|I}$ represents a standard deviation of ambiguities, and the standard deviation depends on a set $I = \{1, 2, \ldots, i-1\}$; $I_i$ represents the $i^{th}$ column vector of a unit-lower-triangular matrix $L^{-T}$ generated from decomposition of $LDL^T$ of a fuzzy covariance matrix; m represents the number of fixed integer ambiguities, and $$\Phi(x) = \int_{-\infty}^{x}(1/\sqrt{2\pi})\exp\left(-\frac{1}{2}v^2\right)dv;$$

a−z represents a difference obtained by subtracting an integer ambiguity calculated using a correlation method from an integer ambiguity calculated using a bootstrap method;

when the correctly fixed integer ambiguity a is equal to the candidate ambiguity value Z, the probability of correct fix PCF is calculated by:

$$P(\tilde{a} = a) = \prod_{i=1}^{m}\left[2\Phi\left(\frac{1}{2\sigma_{i|I}}\right) - 1\right];$$

the probability of incorrect fix PIF is calculated by using an exclusion relation between a correct fix event and an incorrect fix event;

e) determining a fault to be detected and a satellite fault probability;

f) calculating a standard deviation $\delta_{v|CF}$ and a position domain deviation $b_m$;

wherein the following models are established: $y = Gx + \varepsilon$ and $$\begin{cases} \hat{x} = Sy \\ S = (G^T W G)^{-1} G W \end{cases};$$

and an ambiguity float solution-relative position vector matrix $\hat{S}$ and a related estimated error covariance matrix is obtained according to the foregoing equations:

$$\hat{S} = \begin{bmatrix} \hat{x} \\ \hat{N} \end{bmatrix}; P = \begin{bmatrix} P_{\hat{x}} & P_{\hat{x}\hat{N}} \\ P_{\hat{N}\hat{x}} & P_{\hat{N}} \end{bmatrix};$$

where G represents a coefficient matrix; $\epsilon$ represents a total satellite error; $\hat{x}$ represents an estimated value in a solution state; W represents a relation matrix between a pseudorange and an error; $\hat{N}$ represents an estimated value of an integer ambiguity; S represents a state vector; P represents a covariance matrix of position and float ambiguity state estimated error;

step 1: calculating the $k^{th}$ integer ambiguity element $N_z^{(k)}$;

$$N_z^{(k)} = \text{round}([0_{1\times 3} Z_k]S^{(k-1)});$$

where $Z_k$ represents the $k^{th}$ row of a transition matrix Z; $Z_{1:k}=[0_{1\times(k-1)}\ 1\ 0_{1\times(n-k)}]$; $S^{(k-1)}$ represents an updated state vector S based on fixed ambiguities $1 \to K$;

step 2: calculating the standard deviation $\delta_{v|CF}$;

continuously updating position vector estimation and remaining ambiguity real values S;

$$K = P^{(k-1)}[0_{1\times 3}Z_k]^T([0_{1\times 3}Z_k]P^{(k-1)}[0_{1\times 3}Z_k]^T)^{-1};$$

$$S^{(k)} = S^{(k-1)} + K(N_Z^{(k)} - [0_{1\times 3}Z_k]S^{(k-1)});$$

$$P^{(k)} = (I - K[0_{1\times 3}Z_k])P^{(k-1)};$$

where K represents a gain; P represents a covariance matrix of position and float ambiguity state estimated error; $P^{(k)}$ represents a covariance matrix of an updated state vector after the $k^{th}$ ambiguity is fixed; and it is assumed that $\delta_{v|CF} = \sqrt{P_{(3,3)}^{(m)}}$ after m iterations;

step 3: calculating the position domain deviation $b_m$;

$$K = P[0_{m\times 3}Z_{1:m}]^T([0_{m\times 3}Z_{1:m}]P[0_{m\times 3}Z_{1:m}]^T)^{-1};$$

$$S^{(m)} = \hat{S} + K(N_Z^{(1:m)} - [0_{m\times 3}Z_{1:m}]^T\hat{S});$$

where $Z_{1:m}$ represents a transition matrix Z of a row vector 1 to m; $Z_{1:m}=[I_{m\times m}\ 0_{m\times(n-m)}]$; $N_Z^{(1:m)}$ represents a fixed solution for fix of 1 to m integer ambiguities;

the position domain deviation $b_m$ caused by a relative position error of the $m^{th}$ incorrect candidate pair $(a-z)_m$ is:

$$b_m = S_{CF}^{(m)} - S_{IF}^{(m)} = K(a-z)_m;$$

where $a_m$ represents a correctly fixed ambiguity vector; $z_m$ represents an incorrectly fixed ambiguity vectors; $S_{CF}^{(m)}$ represents a correct state obtained after fix of m ambiguities; $S_{IF}^{(m)}$ represents an incorrect state obtained after fix of m ambiguities;

$$S_{CF}^{(m)} = \hat{S} + K(a_m - [0_{m\times 3}Z_{1:m}]\hat{S});$$

$$S_{IF}^{(m)} = \hat{S} + K(z_m - [0_{m\times 3}Z_{1:m}]\hat{S});$$

g) calculating an integrity risk value $I_{H0}$ of a carrier phase for the GNSS;

$$I_{H0} = 1 - (1 - P\{|\hat{x}_v - x_v| > VAL|CF\})PCF - \sum_{n=1}^{k}(1 - P\{|\hat{x}_v - x_v| > VAL|IF_n\})PIF_n;$$

where $P_{VALCF} = P\{|\hat{x}_v - x_v| > VAL|CF\}$ represents a probability that a vertical error is greater than an alarm threshold under the condition of correct fix; PCF represents a probability of correct fix; $PIF_n$ represents a probability of incorrect fix; $P_{VALIF} = P\{|\hat{x}_v - x_v| > VAL|IF_n\}$ represents a probability that a vertical error is greater than an alarm threshold under the condition of incorrect fix; and h) applying the integrity risk value $I_{H0}$ in the navigation system to improve position precision of the navigation system on the kinematic-to-kinematic relative positioning scenario by comparing the integrity risk value $I_{H0}$ to a zero-fault integrity value $I_{H0req}$, wherein a geometric mechanism of the navigation system is considered to be available when the integrity risk value $I_{H0}$ is less than the zero-fault integrity value.

2. The analysis method as described in claim 1, wherein, the calculating a float solution of an integer ambiguity comprises the following steps:

establishing a function model $y = f(x,\beta)$ corresponding to m satellite-collect points $(x_1,y_1,z_1)$, $(x_2,y_2,z_2)$, ..., $(x_m,y_m,z_m)$, and calculating a minimum value $\beta$ of a residual sum of squares, to minimize the residual sum of squares;

wherein $S(\beta) = \sum_{i=1}^{m} r_i(\beta)^2$; and a residual $r_i = y_i - f(x_i,\beta)$ is calculated;

the minimum value is calculated by taking a derivative of the foregoing equation:

$$\frac{\partial s}{\partial \beta_j} = 2\sum_i r_i \frac{\partial r_i}{\partial \beta_j} = 0 \ (j = 1, \ldots, n).$$

3. The analysis method as described in claim 1, wherein, a maximum allowable number of satellite faults is calculated according to $N_{fault,max} = \max\{r \in 1, \ldots, N_{sat} | P_{multiple}(r+1, P_{event,1}, \ldots, P_{event,N_{sat}+N_{const}}) \leq P_{FAVLT\_THRES}\}$;

where $P_{event,i} = PIF_i$ represents a prior probability of an independent error event i; $N_{fault,max}$ represents a probability of a multi-fault modes consisting of r independent events; $N_{sat}$ represents the number of satellites; $N_{const}$ represents the number of constellations; $P_{multiple}$ represents a probability that multiple satellite are faulty; and $P_{FAVLT-THRES}$ represents an alarm threshold.

4. The analysis method as described in claim 3, wherein, $N_{fault,max}$ of a combination corresponding to all subsets is determined according to the $N_{fault,max}$, and is used to determine the satellite fault probability.

5. The analysis method as described in claim 1, wherein, a conditional variance $\sigma_{i/I}^2$ of an ambiguity i is defined, the conditional variance depends on previously fixed integer ambiguities of the set $I = \{1, 2, \ldots, i-1\}$, and an item (i, i) in a diagonal matrix D is generated from decomposition of a float solution estimated error covariance matrix $LDL^T$ of cycle ambiguities.

6. The analysis method as described in claim 1, wherein, by calculating the influence of the pseudo random error on cycle slip detection, a maximum value $\delta\Delta N_1^P(k)_{max}$ of cycle slips detected at the frequency $f_1$ using a cycle as a unit, a maximum value $\delta\Delta N_2^P(k)_{max}$ of cycle slips detected at the frequency $f_2$ using a cycle as a unit, and a difference $\delta[\Delta N_1^P(k) - \Delta N_2^P(k)]_{max}$ between the maximum values of cycle slips detected at the frequencies $f_1$ and $f_2$ using a cycle as a unit is calculated:

$$\delta[\Delta N_1^P(k) - \Delta N_2^P(k)] = \text{int}\left[\frac{f_1 \delta P_1^P(k) + f_2 \delta P_2^P(k)}{\lambda_{WL}(f_1 + f_2)}\right];$$

-continued $$\delta\Delta N_1^P(k) = \text{int}\left[\frac{-\lambda_2}{(\lambda_1-\lambda_2)}\frac{f_1\delta P_1^P(k)+f_2\delta P_2^P(k)}{\lambda_{WL}(f_1+f_2)}\right];$$

$$\delta\Delta N_2^P(k) = \text{int}\left[\frac{-\lambda_1}{(\lambda_1-\lambda_2)}\frac{f_1\delta P_1^P(k)+f_2\delta P_2^P(k)}{\lambda_{WL}(f_1+f_2)}\right].$$

7. The analysis method as described in claim 1, wherein, the wide-lane cycle slip variation is calculated by using the maximum value $SPIE_{max}$ of the pseudo random error.

8. The analysis method as described in claim 1, wherein, a threshold model of the total electron content rate is further used to reduce remaining cycle slip candidate pairs, and is further used to revise carrier phase measurement values at the frequencies $f_1$ and $f_2$ for candidate pairs $\Delta N_1^P(k)_{cand}$ at the frequency $f_1$ and candidate pairs $\Delta N_2^P(k)_{cand}$ at the frequency $f_2$ by the following equations:

$$\widehat{\Phi_1^P(k)} = \Phi_1^P(k) + \Delta N_1^P(k)_{cand};$$

$$\widehat{\Phi_2^P(k)} = \Phi_2^P(k) + \Delta N_2^P(k)_{cand}.$$

9. The analysis method as described in claim 1, wherein, when the probability of correct fix PCF and the probability of incorrect fix PIF are calculated for the integer ambiguity, a conditional variance of an ambiguity i is defined as $\sigma_{i/I}^2$, the conditional variance depends on previously fixed integer ambiguities of the set I={1, 2, . . . , i−1}, and an item (i, i) in a diagonal matrix D is generated from decomposition of a float solution estimated error covariance matrix $LDL^T$ of cycle ambiguities.

10. The analysis method as described in claim 1, wherein, the probability of correct fix PCF is calculated, and for the calculation of the probability of incorrect fix PIF, a value of (a−z) is used, and a candidate value of interest in an incorrect fix event is calculated.

11. The analysis method as described in claim 1, further comprising, in step h):
when the integrity risk value $I_{H0}$ is greater than the zero-fault integrity value $I_{H0req}$, determining that the float solution of a next ambiguity is to be fixed, without traversing all of the candidate ambiguity values.

* * * * *